(12) United States Patent
Mandella et al.

(10) Patent No.: US 7,242,521 B2
(45) Date of Patent: Jul. 10, 2007

(54) DUAL-AXIS CONFOCAL MICROSCOPE HAVING IMPROVED PERFORMANCE FOR THICK SAMPLES

(75) Inventors: Michael J. Mandella, Cupertino, CA (US); Gordon S. Kino, Stanford, CA (US); Ning Y. Chan, Palo Alto, CA (US)

(73) Assignees: Optical Biopsy Technologies, Inc., Palo Alto, CA (US); The Board of Trustees of the Leland Stanford Junior University, Palo Alto, CA (US)

( * ) Notice: Subject to any disclaimer, the term of this patent is extended or adjusted under 35 U.S.C. 154(b) by 218 days.

(21) Appl. No.: 10/856,511

(22) Filed: May 27, 2004

(65) Prior Publication Data

US 2005/0264877 A1 Dec. 1, 2005

(51) Int. Cl.
*G02B 21/00* (2006.01)
*G02B 21/06* (2006.01)

(52) U.S. Cl. .............. 359/368; 359/372; 359/385; 359/387

(58) Field of Classification Search ........ 359/368–390, 359/505–511, 204, 642; 356/345–360, 318
See application file for complete search history.

(56) References Cited

U.S. PATENT DOCUMENTS

| | | | |
|---|---|---|---|
| 3,166,623 A | 1/1965 | Waidelich, Jr. ............. 385/119 |
| 4,257,672 A | 3/1981 | Balliet .......................... 355/35 |
| 4,557,566 A | 12/1985 | Kikuchi et al. ............. 359/652 |
| 4,692,024 A * | 9/1987 | Bloss .......................... 356/135 |
| 5,004,328 A | 4/1991 | Suzuki et al. ................ 359/664 |
| 5,162,648 A * | 11/1992 | Iwasaki ....................... 250/216 |
| 5,220,403 A * | 6/1993 | Batchelder et al. ......... 356/450 |
| 5,247,392 A | 9/1993 | Plies ............................ 359/661 |
| 5,692,072 A | 11/1997 | Hashimoto .................. 382/199 |

(Continued)

FOREIGN PATENT DOCUMENTS

JP 2002-357767 * 12/2002 ................. 359/642

(Continued)

OTHER PUBLICATIONS

Wang et al., "Dual-axes confocal microscopy with post-objective scanning and low-coherence heterodyne detection," Optics Letters 28(20) pp. 1915-1917, Oct. 2003.

(Continued)

*Primary Examiner*—Thong Q Nguyen
(74) *Attorney, Agent, or Firm*—Lumen Intellectual Property Services, Inc.

(57) ABSTRACT

An optical head for confocal microscopy that is especially advantageous for measurements on thick samples is provided. An interface between the optical head and the sample is index matched, to avoid beam aberration at this interface. The optical head includes a window having a convex surface facing away from the sample, so that light beams crossing this convex surface do so at or near normal incidence and are therefore not significantly aberrated. The window is rotationally symmetric about an axis perpendicular to the interface between the head and the sample. The head also includes at least two optical fibers, which can be used for input and/or output. Beams passing to and/or from the fibers are collimated by collimators. A single focusing element couples all the collimated beams to focused beams which pass through the window to intersect within a target region of the sample as confocal beams.

21 Claims, 5 Drawing Sheets

U.S. PATENT DOCUMENTS

| | | | |
|---|---|---|---|
| 5,710,625 A | 1/1998 | Neumann et al. | 356/244 |
| 6,005,834 A * | 12/1999 | Maeda et al. | 369/112.24 |
| 6,064,517 A | 5/2000 | Chuang et al. | 359/364 |
| 6,181,478 B1 * | 1/2001 | Mandella | 359/642 |
| 6,257,730 B1 * | 7/2001 | Kleinberg et al. | 359/600 |
| 6,369,928 B1 | 4/2002 | Mandella et al. | 359/204 |
| 6,414,779 B1 | 7/2002 | Mandella et al. | 359/212 |
| 6,424,308 B1 | 7/2002 | Wu et al. | 343/753 |
| 6,639,203 B1 | 10/2003 | Kerschner | 250/216 |
| 7,130,042 B2 * | 10/2006 | Kino et al. | 356/318 |

OTHER PUBLICATIONS

Wang et al., "Dual-axis confocal microscope for high-resolution in vivo imaging," Optics Letters 28(6) pp. 414-416, Mar. 2003.

* cited by examiner

DUAL-AXIS CONFOCAL MICROSCOPE HAVING IMPROVED PERFORMANCE FOR THICK SAMPLES

GOVERNMENT SPONSORSHIP

This invention was made with Government support under contract CA105296, EB001864 awarded by the National Institutes of Health. The Government has certain rights in this invention.

FIELD OF THE INVENTION

This invention relates to confocal microscopy, and more particularly to dual-axis confocal microscopy.

BACKGROUND

Conventional wide field microscopy is based on formation of a high-magnification image of an illuminated sample using conventional microscope optics. In contrast, confocal microscopy is based upon illumination of a small part of the sample, referred to as a target region, and on selective collection of light emitted from the target region. Image formation is accomplished by scanning the position of the target region within the sample. Typically, the sample is illuminated with an illumination beam which is brought to a diffraction-limited (or nearly so) focus within the sample. Light emitted by the part of the sample within the focal region of the illumination beam is selectively collected and detected.

It is helpful to define an observation beam as being the beam that would be present if the optical detector in the above selective collection and detection arrangement were replaced by an optical source. Parts of the sample outside the observation beam are generally "not seen" by the detector. Thus the overlap of the illumination beam and observation beam defines the target region. Since it is generally desirable to decrease the size of the target region as much as possible, the illumination beam and observation beam are typically both brought to a small diffraction-limited focus (e.g., using a high numerical aperture (NA) lens having low aberration). Furthermore, the focal regions of the illumination beam and observation beam typically overlap (i.e., the two beams are typically confocal).

In the earliest confocal microscopes, the illumination beam and observation beams are collinear. In fact, frequently the same optical elements define the observation and illumination beams, and the observed signal is separated from the illumination light with a beamsplitter or directional coupler. When a beam is brought to a focus, the resulting focal region typically has an axial dimension several times larger than its transverse dimensions, especially if the focusing numerical aperture is less than 0.5. Here the axial direction is along the beam axis and the transverse directions are perpendicular to the beam axis. Thus, collinear illumination and observation beams typically provide a generally "cigar shaped" target region, having an axial dimension several times larger than its transverse dimensions.

More recently, for example in U.S. Pat. No. 5,973,828, non-collinear illumination and observation beams have been employed. Since the two beams intersect at an angle, the resulting target region is smaller than it would be for collinear beams. In particular, the target region can be roughly spherical and can have a radius on the order of the transverse beam dimensions. Such confocal microscopes are referred to as dual axis confocal microscopes.

A further variant of a dual axis confocal microscope is considered in U.S. Pat. No. 6,369,928, where two non-collinear illumination beams are supplied to the sample. In this arrangement, the illumination beam optics can conveniently define non-collinear observation beams (e.g., illumination optics 1 defines observation beam 2 and vice versa). Alternatively, light emitted from a sample region where the two illumination beams overlap can be selectively collected by optics other than the illumination beam optics.

In some cases, it is desirable to perform dual axis confocal microscopy on a sample having a significant thickness, such that the target region is within the sample as opposed to being on a sample surface. For example, biological or medical applications of confocal microscopy frequently require the ability to image structures within a tissue sample.

However, significant beam aberration can occur when a beam is non-normally incident on an interface having a refractive index discontinuity. Since a thick sample typically entails at least one such interface, this source of aberration must be considered in dual axis confocal microscopy of thick samples. One approach for alleviating this difficulty is considered in an article by Wang et al. in Optical Letters 28(2) pp 1915–7 2003, where the sample is tissue, and beams pass through a prism, a water bead, and a cover glass before reaching the sample. The prism and water have an index close to that of the tissue sample, and the beams are normally incident on the prism-air interfaces. But the approach of Wang et al. is complex (since many optical elements are required) and inflexible (since it is not straightforward to add additional input or output beams).

Accordingly, it would be an advance in the art to provide a dual axis confocal microscope for use with thick samples having a simpler and more flexible configuration than previously known.

SUMMARY

The present invention provides an optical head for confocal microscopy that is especially advantageous for measurements on thick samples. An interface between the optical head and the sample is index matched, to avoid beam aberration at this interface. The optical head includes a window having a convex surface facing away from the sample, so that light beams crossing this convex surface do so at or near normal incidence and are therefore not significantly aberrated. The window is rotationally symmetric about an axis perpendicular to the interface between the head and the sample. The head also includes at least two optical fibers, which can be used for input and/or output. Beams passing to and/or from the fibers are collimated by collimators. A single focusing element couples all the collimated beams to focused beams which pass through the window to intersect within a target region of the sample as confocal beams.

DETAILED DESCRIPTION

Figure 1:
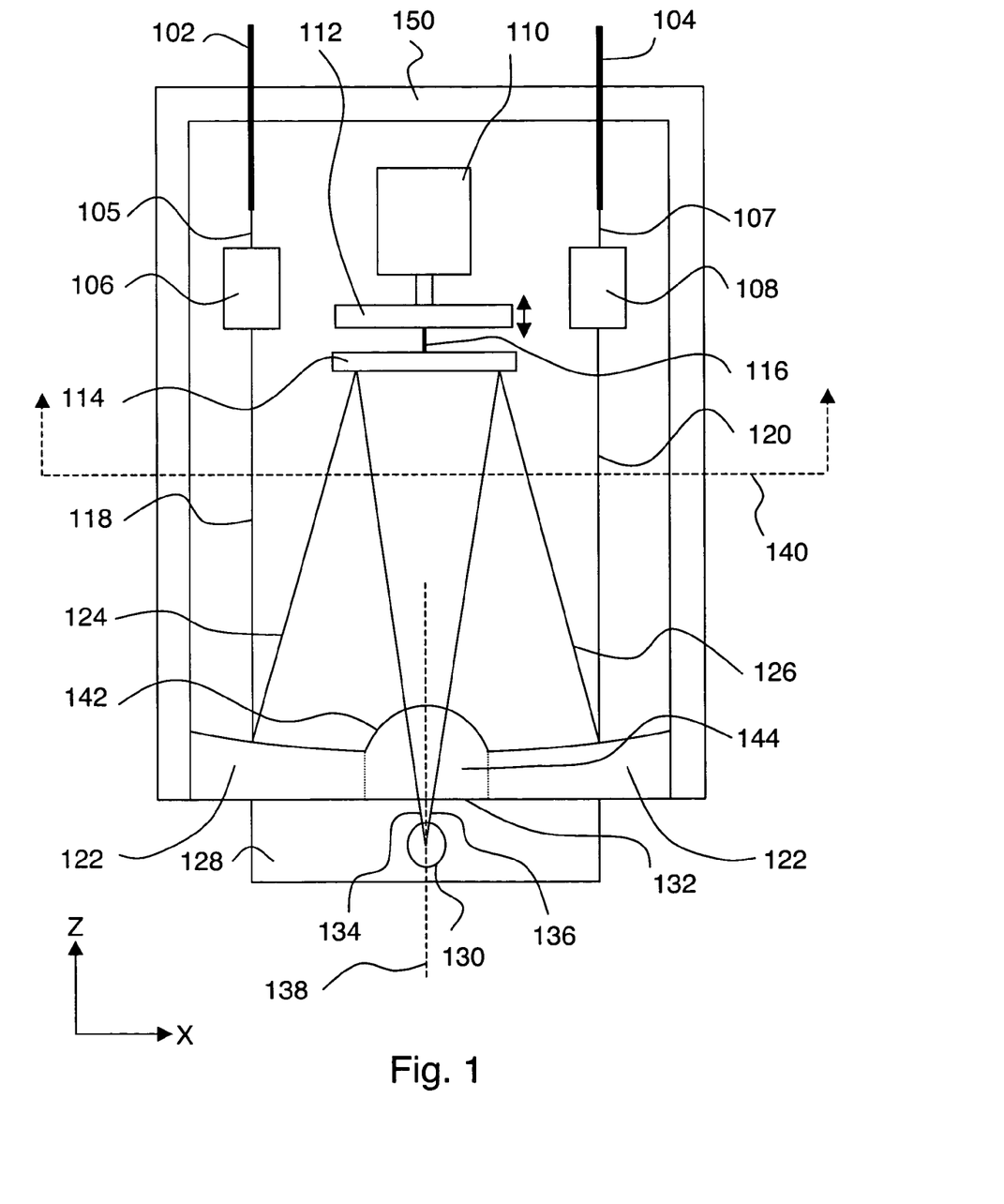
FIG. 1 shows an optical head having a dual axis confocal microscope arrangement according to an embodiment of the invention.

FIG. 1 shows an optical head having a dual axis confocal microscope arrangement according to an embodiment of the invention. On FIG. 1, all optical beams are shown using a single line along the beam axis. In the embodiment of FIG. 1, a first optical fiber 102 emits an input beam 105. Optical fiber 102 can be a single-mode fiber or a multi-mode fiber. Input beam 105 is received by an input collimator 106 which provides a collimated input beam 118. Input collimator 106 can be a refractive optical element (including graded-index (GRIN) lenses), a reflective optical element, a diffractive optical element, or any combination thereof. Preferably input collimator 106 is an ellipsoidal solid immersion lens (ESIL) that allows direct attachment of an optical fiber to the ESIL by an adhesive or fusion-splice method. This provides a collimator that is integrated with first fiber 102, in order to reduce cost by reducing the number of parts. The properties of ESIL collimators can be found in U.S. Pat. No. 6,643,068. Alternatively, a GRIN lens (e.g., from Nippon Sheet Glass Co., Ltd) or an integrated collimator (e.g., from Lightpath Technology, Inc.) can be used in place of the ESIL.

Collimated input beam 118 is received by a focusing element 122 which provides a focused input beam 124. Focusing element 122 can be a refractive optical element, a reflective optical element having a curved reflective surface, a diffractive surface, or any combination thereof. For example, a refractive focusing element can be employed in a configuration where the optical paths shown on FIG. 1 are "unfolded" at the location of focusing element 122. Preferably, focusing element 122 is a parabolic mirror, since such a mirror is suitable for bringing two (or more) collimated beams incident on it to a focus at the same focal point. Furthermore, the focal length of a parabolic mirror is advantageously independent of optical wavelength (i.e., the focal length is achromatic).

Focused input beam 124 is preferably reflected from a scan mirror 114 and is received by a window 144. Scan mirror 114 is optional, but is present in preferred embodiments to provide scanning capability. Scanning will be considered in more detail below. Window 144 provides a confocal input beam 134 to a sample 128. An interface 132 between the head of FIG. 1 and sample 128 is substantially index-matched, so that confocal input beam 134 is not significantly aberrated by transmission across interface 132 at non-normal incidence. Various approaches for providing such index matching will be discussed below in connection with FIGS. 3a–c.

Window 144 has a convex surface 142 facing away from sample 128, and is rotationally symmetric about an axis 138 perpendicular to interface 132. Focused input beam 124 preferably crosses convex surface 142 at or near normal incidence in order to incur negligible aberration. Preferably surface 142 is spherical or nearly spherical, since such a window configuration advantageously provides increased numerical aperture (NA). More specifically, the NA of the beams is increased by a factor of n, where n is the refractive index of sample 128, compared to a case when a flat window is used. This increased NA is obtained because the ray paths are effectively unchanged when the rays are normal to a spherical surface 142. To minimize aberration, it is also preferred for surface 142 and focused input beam 124 to be at least approximately wave-front matched. Beam 124 is wave-front matched to surface 142 if the phase of beam 124 is constant along surface 142. For example, if surface 142 is spherical and has a radius of curvature R, beam 124 is wave-front matched to surface 142 if beam 124 has a radius of curvature of R at its intersection with surface 142 and is normally incident on surface 142.

Since light collection in a confocal microscope is selective, as indicated above, a well defined observation beam is defined by the collection optics. Accordingly, a confocal output beam 136 is emitted from a target region 130 of sample 128. The target region 130 is defined by the intersection of confocal input beam 134 with confocal output beam 136. Preferably, confocal input beam 134 and confocal output beam 136 both come to a focus at or near target region 130, to maximize spatial resolution. This condition of beams coming to a focus at or near target region 130 is preferably provided by selecting a propagation distance from focusing element 122 to target region 130 to be about equal to the focal length of focusing element 122.

Confocal output beam 136 passes through window 144 to provide a focused output beam 126. Aberration incurred in transmission from target region 130 to focused output beam 126 is reduced by index matching at interface 132 and is preferably further reduced by wave-front matching focused output beam 126 to surface 142, as discussed above. The generally symmetric arrangement of input and output beams shown on FIG. 1 is preferred, since it advantageously simplifies the task of providing low aberration for both input and output beams.

Focused output beam 126 is preferably reflected from scan mirror 114, and is received by focusing element 122 which provides a collimated output beam 120. Collimated output beam 120 is received by an output collimator 108, which provides an output beam 107 received by a second optical fiber 104. Second optical fiber 104 can be a single-mode fiber or a multi-mode fiber. Output collimator 108 can be a refractive optical element (including ESIL or GRIN lenses), a reflective optical element, a diffractive optical element, or any combination thereof. Preferably input collimator 108 is an ellipsoidal solid immersion lens (ESIL) that allows direct attachment of an optical fiber to the ESIL by an adhesive or fusion-splice method. This provides a collimator that is integrated with second fiber 104, in order to reduce cost by reducing the number of parts. Alternatively, a GRIN lens (e.g., from Nippon Sheet Glass Co., Ltd) or an integrated collimator (e.g., from Lightpath Technology, Inc.) can be used in place of the ESIL.

FIG. 1 shows a preferred mechanical configuration for an optical head according to the invention, where window 144 is integrated with focusing element 122, and a case 150 is attached to focusing element 122 and defines the boundary of the head. Fibers 102 and 104 pass through case 150. In cases where scan mirror 114 is present, power and or control signals for scanning (not shown) also pass through case 150. Thus the head of FIG. 1 is a fiber-coupled assembly suitable for miniaturization and use in a wide variety of applications where more traditional confocal microscope arrangements would be difficult or even impossible to use.

In the preceding description, second fiber 104 acts as an output fiber. However, in some cases it is desirable to perform confocal microscopy with two input beams, and one approach for providing a second input beam is via second optical fiber 104. In this case, second fiber 104 emits an additional input beam which is received by output collimator 108 to provide an additional collimated input beam. The additional collimated input beam is received by focusing element 122 which provides an additional focused input beam. The additional focused input beam is received by window 144 which provides an additional confocal input beam to target region 130 of sample 128. These additional input beams follow the same path as output beams 107, 120, 126, and 136 in the opposite direction.

Similarly, in some cases it is desirable to use two output beams for confocal microscopy, and one approach for providing a second output beam is via first optical fiber 102. In this case, an additional confocal output beam is emitted from target region 130 of sample 128. The additional confocal output beam is received by window 144 which provides an additional focused output beam. The additional focused output beam is received by focusing element 122, which provides an additional collimated output beam. The additional collimated output beam is received by input collimator 106, which provides an additional output beam to first fiber 102. These additional output beams follow the same path as input beams 134, 124, 118, and 105 in the opposite direction. The use of proper fiber optic couplers to provide such dual-purpose functionality of the optical ports of a fiber-coupled dual axis confocal microscope is described in U.S. Pat. No. 6,369,928.

An advantage of using a single fiber for both an input and an output, as in the examples above, is that the number of optical components is reduced compared to configurations having a dedicated fiber for each optical input and output. Separating a fiber-coupled input from a fiber-coupled output can be accomplished in various well-known ways, including but not limited to use of a beam splitter, a circulator or a directional coupler.

As indicated above, the optical head of FIG. 1 preferably includes a scan mirror 114 to provide scanning capability. In the example of FIG. 1, scanning mirror 114 is attached to a stage 112 by a biaxial flexure 116. Stage 112 is attached to a vertical actuator 110, which provides vertical (i.e. +/−Z directed on FIG. 1) motion of stage 112 and thus of scan mirror 114. The vertical actuator 110 can be any device suitable for providing a translational motion, including but not limited to a voice coil, a piezoelectric actuator, a linear micromechanical actuator, a pneumatic actuator and a hydraulic actuator. Preferably, vertical actuator 110 is a voice coil. When stage 112 is vertically translated by vertical actuator 110, target region 130 moves vertically within sample 128.

In FIG. 1, scan mirror 114 is attached to stage 112 with a biaxial flexure 116. Such a flexure permits scan mirror 114 to tilt with respect to stage 112 about two axes (i.e., the X and Y axes on FIG. 1). Although the invention can be practiced using any approach for tilting scan mirror 114, the use of microelectromechanical systems (MEMS) technology for stage 112, flexure 116 and scan mirror 114 is preferred to reduce size and cost. When scan mirror 114 is tilted about the Y axis on FIG. 1, target region 130 moves in an arc in the X-Z plane. In most cases, the radius of curvature of this arc is much larger than the length along which a scan can be performed, and thus tilting scan mirror 114 about the Y axis moves target region 130 substantially along the X axis. Similarly, tilting scan mirror 114 about the X axis typically moves target region 130 substantially along the Y axis. More generally, tilting scan mirror 114 moves target region 130 substantially parallel to interface 132. Thus 3-D scanning can be obtained by combining the XY scanning capability provided by tilting scan mirror 114 with the Z scanning capability provided by translation of scan mirror 114 with vertical actuator 110.

Figure 2A:
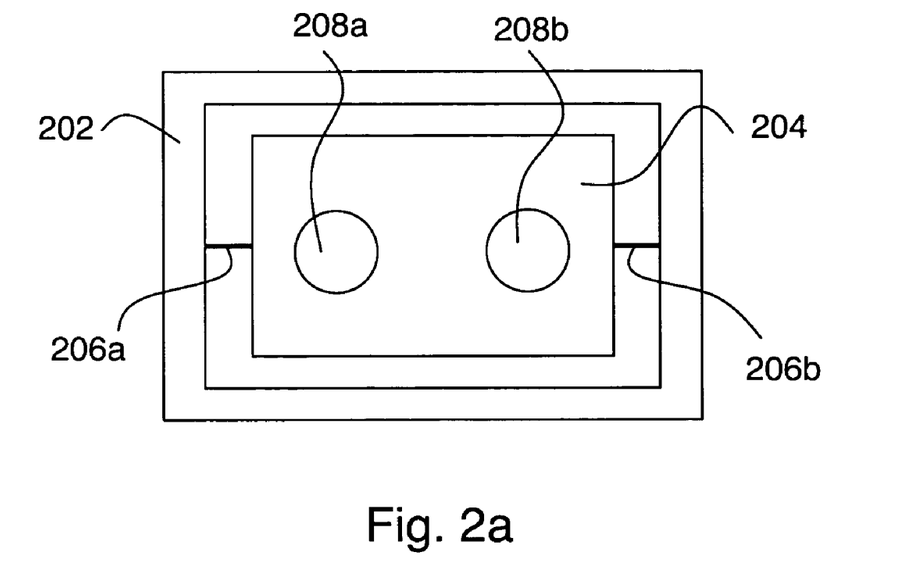
FIGS. 2a–b show various uniaxial scanning mirror arrangements according to embodiments of the invention.

For some applications, the XY scanning capability provided by the biaxial mirror of FIG. 1 is not required, and a uniaxial mirror having a single degree of freedom is sufficient. FIG. 2a is a view (140 on FIG. 1) of such a uniaxial mirror disposed in the position of mirror 114 on FIG. 1. Thus FIG. 2a shows a uniaxial mirror as seen from focusing element 122 on FIG. 1. On FIG. 2a, a mirror 204 is connected to a frame 202 via flexures 206a,b. Mirror 204 can rotate about the axis of flexures 206a,b. Input focused beam 124 on FIG. 1 makes a spot 208a on mirror 204, and output focused beam 126 on FIG. 1 makes a spot 208b on mirror 204. An alternate uniaxial mirror configuration is shown on FIG. 2b, where two independent uniaxial mirrors 204a and 204b are connected to a frame 210 by flexures. Mirror 204a scans input focused beam 124, and mirror 204b scans output focused beam 126.

Figure 2B:
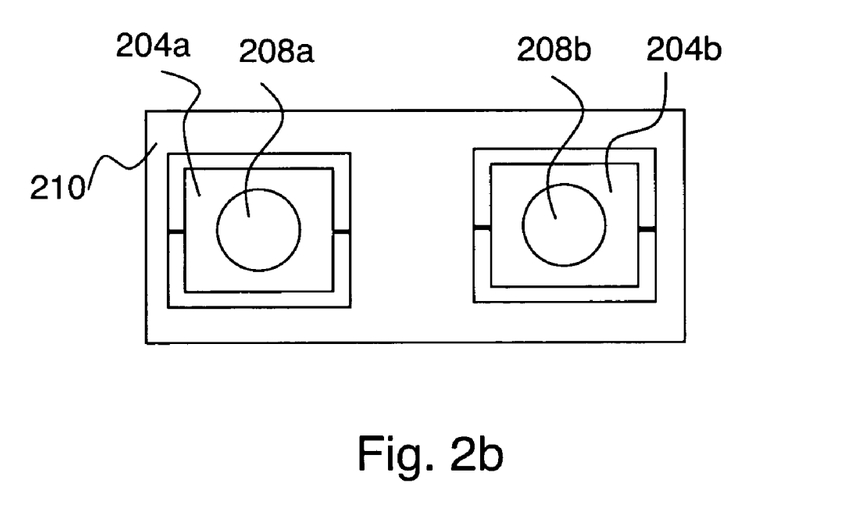

In the examples of FIGS. 2a and 2b, mirrors are tilted about the X axis, resulting in scanning of the target region substantially along the Y axis. Y axis mirror tilts can be used to provide scanning of the target region substantially along the X axis. Combination of a uniaxial scanning mirror with vertical scanning can be used to provide XZ or YZ plane scanning capability.

Since the mirrors of FIG. 2b are smaller than the mirror of FIG. 2a, they can be moved more rapidly, and therefore can provide improved scanning speed. However, the two mirrors of FIG. 2b must be tilted in a coordinated manner to ensure intersection of the two beams to form a target region, whereas this coordination is inherently provided by the single mirror of FIG. 2a. Thus there is a general trade between scanning speed (using multiple small mirrors) and scanning simplicity (using a single large mirror) that can go either way, depending on specific application requirements. Similarly, it is also possible to use multiple biaxial scan mirrors (instead of the single biaxial scan mirror shown on FIG. 1) to increase scan speed.

Many different combinations of uniaxial and biaxial scanning mirrors can be used to steer the beams in a coordinated way to achieve a specific type of scan of the target region through a thick sample. For example, a pair of coplanar mirrors could be arranged to rotate together about a common axis. In this case, the confocal overlap between the two beams can be maintained while the target region is steered to other positions along a substantially lateral trajectory within the thick sample. In other cases, the two mirrors can have parallel rotation axes so that counter-rotation of the mirrors moves the target region substantially vertically within the thick sample. These methods are described in U.S. Pat. No. 6,423,956.

On FIG. 1, window 144 is fabricated from a single block of material, and this material is index matched sufficiently well to sample 128 to render beam aberration in crossing interface 132 negligible. In some cases, the refractive index of sample 128 will be such that the window configuration of FIG. 1 is not preferred. For example, if sample 128 is a biological tissue sample, its refractive index is roughly 1.3. Optical materials suitable for window 144 tend not to have such a low index of refraction. However, this issue can be addressed in various ways, as shown on FIGS. 3a–c.

Figure 3A:
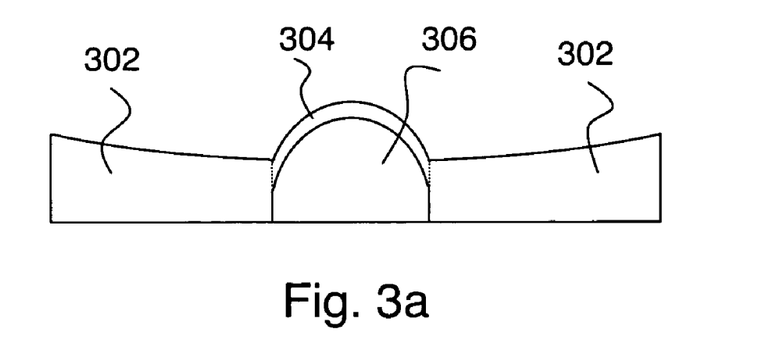
FIGS. 3a–c show various windows according to embodiments of the invention.

On FIG. 3a, a focusing element 302 is integrated with a window 304. Window 304 has a concave surface facing sample 128 (not shown). A solid medium 306 is affixed to window 304 and fills the cavity between window 304 and sample 128. Solid medium 306 is selected to provide an index matched interface (132 on FIG. 1) between the head and sample 128. For example, Teflon® AF with an index of 1.314 is a suitable medium for index matching to a biological tissue sample. Preferably, window 304 has the configuration of a spherical shell, as shown on FIG. 3a, so that at least approximate wave-front matching to input and output beams can be obtained at both surfaces of window 304.

Figure 3B:
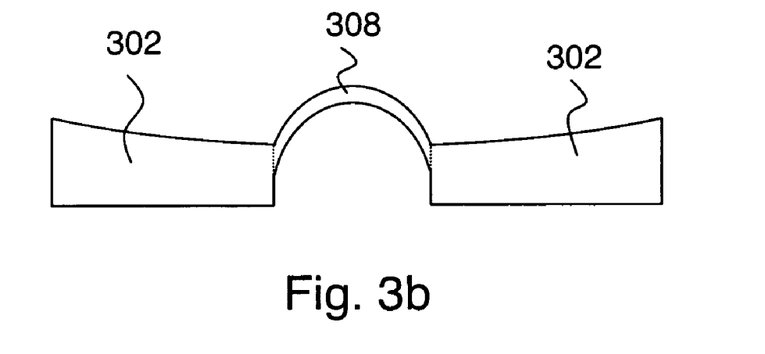
Figure 3C:
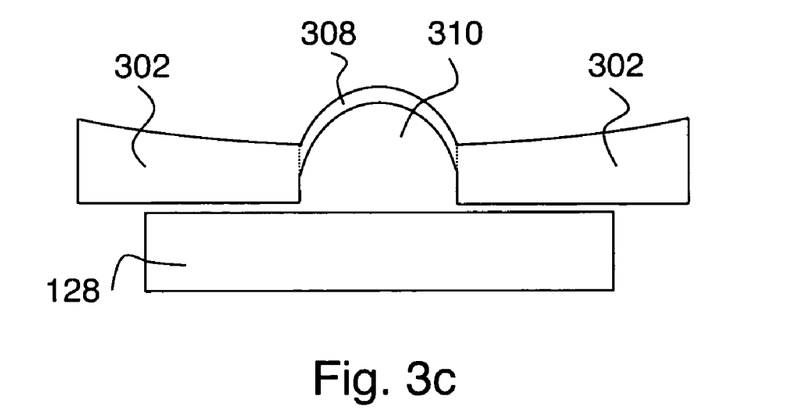

FIG. 3*b* shows an alternative window configuration, where solid medium 306 is not present. A window 308 is integrated with a focusing element 302. The configuration of FIG. 3*b* is suitable for biological application, where an index matching fluid will fill the cavity formed between window 308 and sample 128 during use. For example, FIG. 3*c* shows the window of FIG. 3*b* in operation, where a fluid 310 fills the space between window 308 and sample 128. In biological applications, this fluid typically has a refractive index of about 1.3, corresponding to the refractive index of water, and is therefore suitable for index matching to a biological tissue sample. Preferably, window 308 has the configuration of a spherical shell, as shown on FIG. 3*b*, so that at least approximate wave-front matching to input and output beams can be obtained at both surfaces of window 308.

Thus the window configurations of FIGS. 3*a* and 3*b* can provide an index matched interface between the optical head and sample 128. Preferably, the window and focusing element are integrated, as shown in FIGS. 1 and 3*a–c*. However, the invention can also be practiced with configurations having a window which is separate from the focusing element. Note that the optical element formed by the window has the general configuration of a plano-convex lens (or a truncated hemisphere). A hemispherical configuration would tend to focus the beams right at interface 132, which is not preferred. Instead, it is preferred to have the beams come to a focus below interface 132 on FIG. 1, and accordingly the optical element formed by the window is preferably less than a full hemisphere.

Figure 4A:
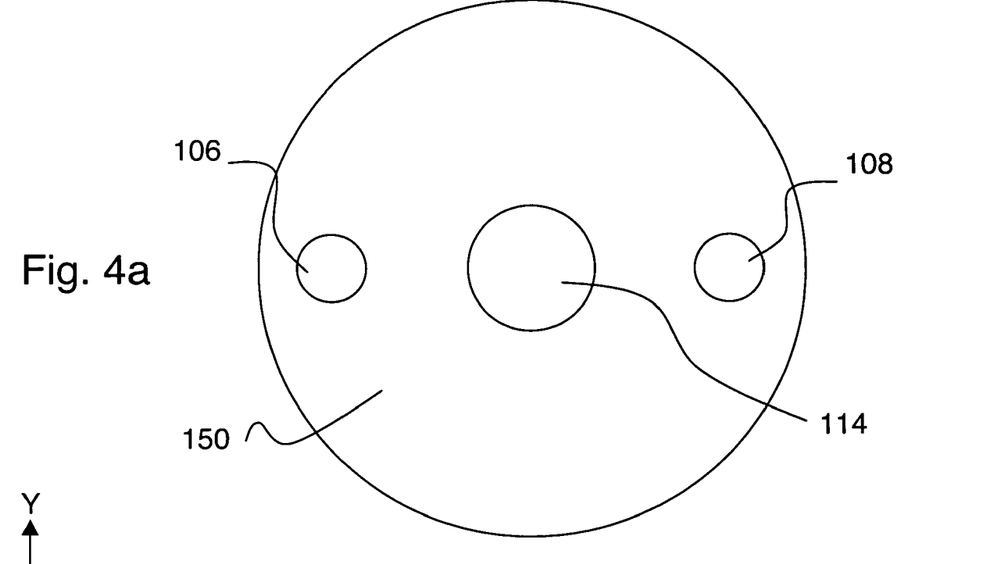
FIGS. 4a–b show various beam arrangements according to embodiments of the invention.

Preferably, focusing element 122 on FIG. 1 is rotationally symmetric about axis 138. Such a configuration advantageously provides a great deal of flexibility for providing various configurations of input and/or output beams, e.g., as shown on FIGS. 4*a–b*. FIG. 4*a* shows an alternate view (140 on FIG. 1) of the configuration of FIG. 1, where collimators 106 and 108 are seen, as is mirror 114, and behind them all is case 150. In other words, FIG. 4*a* is a view of the configuration of FIG. 1 as seen from focusing element 122.

Figure 4B:
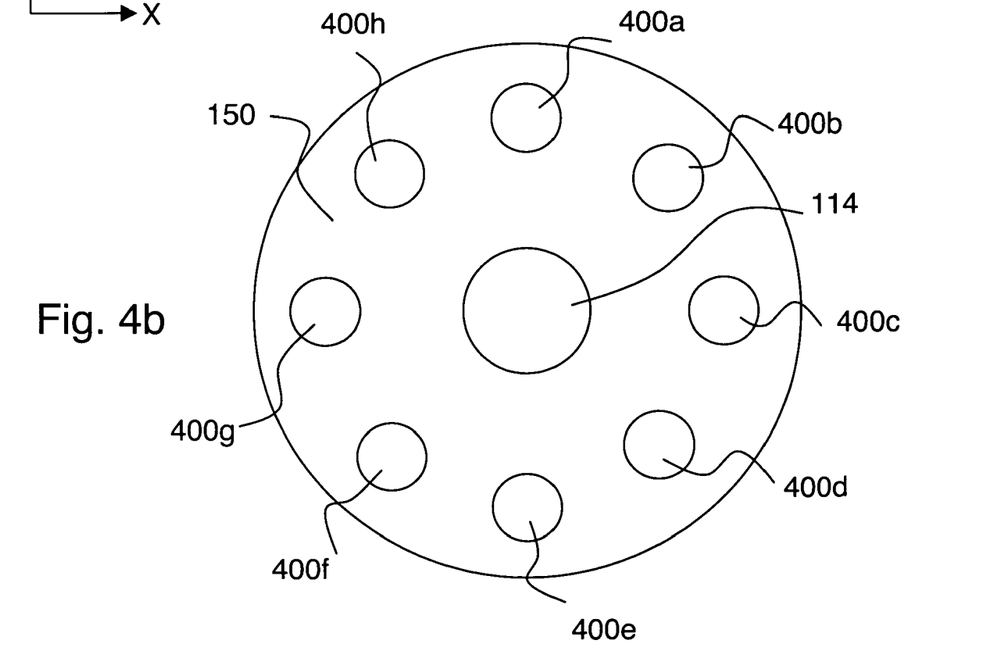

In the preferred configuration where focusing element 122 is symmetric about axis 138, it is straightforward to add additional inputs and/or outputs, since both window 144 and focusing element 122 are rotationally symmetric. For example, FIG. 4*b* shows a view (140 on FIG. 1) of a configuration having 8 ports for input and/or output defined by collimators 400*a–h*. Preferably, each of these collimators are coupled to an end of a corresponding optical fiber. Collimated beams from or to any of these collimators are focused by focusing element 122 and pass through window 144 in the same way, which greatly simplifies the design of such multi-beam configurations.

An example of how such a configuration can be used in practice follows. Ports defined by collimators 400*a* and 400*e* connected to respective single-mode fibers can be used for input and output respectively for high resolution imaging at a first wavelength (e.g., 1.3 μm). Ports defined by collimators 400*b* and 400*f* connected to respective single-mode fibers can be used for input and output respectively for high resolution imaging at a second wavelength (e.g., 750 nm). Ports defined by collimators 400*c* and 400*g* connected to respective multi-mode fibers can be used for input and output respectively for broadband light scattering spectroscopy. A port defined by collimator 400*d* connected to a multi-mode fiber can be used for input of a high-power light beam for altering properties of sample 128 (i.e., treating the tissue being observed). A port defined by collimator 400*h* connected to a multi-mode fiber can be used to collect fluorescence from the target region responsive to one or more of the input light beams. In this example, paired input and output ports are diametrically opposed. Alternatively, input and output ports need not be diametrically opposed (e.g., port 400*a* can be an input having port 400*b* as a corresponding output). Such a non-diametrically opposed configuration is especially suitable for measuring fluorescence, where it is desirable to reduce the amount of specularly reflected light and/or forward scattered light that is collected.

In the example of FIG. 4*b*, a single mirror 114 can scan all beams simultaneously. Indeed, a key discovery of the present invention is that window 144 need not have translational invariance in the direction along which scanning is performed, as one would expect, and as shown by Wang et al. in Optical Letters 28(2) pp 1915–7 2003. Instead, a rotationally symmetric window can be employed, which provides much greater flexibility in beam arrangement than the prism window of Wang et al. Since the window of the present invention is not translationally invariant in a scan direction, the effect of the window on the location and shape of the target region depends on the angle of scan mirror 114. However, we have found that this scan angle dependence has a negligible impact on performance within an angular range that provides a sufficiently useful scanned field-of-view (FOV) in the x or y direction.

Figure 5:
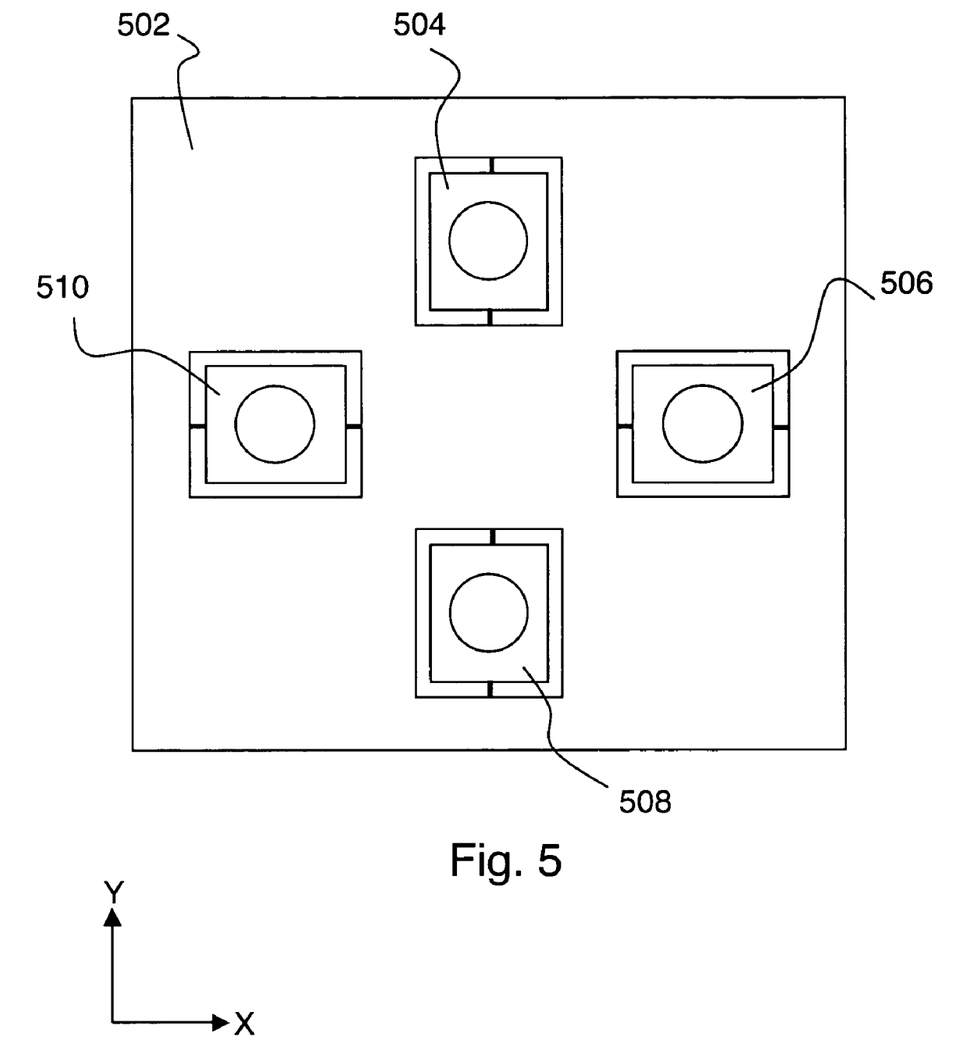
FIG. 5 shows a four-port uniaxial scanning mirror arrangement according to an embodiment of the invention.

Multiple beam configurations such as in FIG. 4*b* can be combined with multiple mirror configurations such as in FIG. 2*b*. For example, FIG. 5 shows a configuration of four uniaxial mirrors 504, 506, 508, and 510 attached to a frame 502 for use with a four port configuration. Mirrors 504 and 508 provide X scanning capability, and are coupled to a first pair of ports. Mirrors 506 and 510 provide Y scanning capability, and are coupled to a second pair of ports. Thus the mirror arrangement of FIG. 5 in a four port system provides XZ scanning capability and YZ scanning capability (when combined with vertical scanning as shown on FIG. 1). Since the first and second pairs of ports in this example are independent, the XZ and YZ scans can be performed simultaneously. Such XZ and YZ scanning entails gathering far less data than a full 3D scan, and can provide enough information in some cases that a full 3D scan is not necessary.

The above description of the invention has been by way of example as opposed to limitation, and the invention can be practiced with many variations in the above-given details. For example, the ports shown in FIG. 4*b* are symmetrically disposed, which is preferable to maximize the spacing between ports. However, the ports can be disposed asymmetrically, which could be required by other mechanical constraints on the head design.

As another example, the window 144 is shown as having a convex surface facing away from the sample, since it acts as a focusing element. Such focusing can also be provided by a window having a diffractive surface (e.g., a binary lens) facing away from the sample. For example, a circular grating (or binary lens) can be designed to provide a focal length equal to that of a convex surface, at a particular design wavelength. However, a diffractive window such as a binary lens will tend to have more significant wavelength-dependent performance than a window having a convex surface.

As a further example, surface 142 can be an aspheric surface, which can be designed to further minimize beam aberration. The design of such an aspheric surface can be determined by computer modeling. For example, such modeling has been performed using the well known optical modeling software packages Zemax and ASAP, where the computer model also includes the effects of the sample thickness and tilt and translation of the scan mirrors. In these studies we have modeled various embodiments of the invention i.e., embodiments using a single uniaxial or biaxial scan mirror to scan all the beams and versions using multiple scan mirrors (uniaxial or biaxial), where each beam is scanned individually by a respective mirror.

Depending on the depth of the target region within the thick sample and the amount of the mismatch in refractive index at the sample interface, we have found cases where the optimal shape of the surface 142 is a conic surface of revolution having a conic constant k ranging between k=1 and k=58. Such optical modeling methods are well known in the art and the invention herein provides many degrees of freedom allowing the designer to optimally adapt the invention to a particular application. These methods can also be used for determining an optimized profile of the focusing element 122 which can be a surface of revolution described by a parabola (k=−1), which also include one or more higher order aspheric terms. Many design trade-offs exist depending on whether the aim is to maximize field of view, maximize range of imaging depth in sample, minimize complexity, or fulfill one or more other requirements of the device.

What is claimed is:

1. An optical head for coupling optical radiation to and from a sample, the optical head comprising:
    a) a first optical fiber emitting an input beam;
    b) a second optical fiber receiving an output beam;
    c) an input collimator receiving said input beam and providing a collimated input beam;
    d) an output collimator providing said output beam responsive to a collimated output beam;
    e) a focusing element comprising a parabolic mirror receiving said collimated input beam and providing a focused input beam, and providing said collimated output beam responsive to a focused output beam; and
    f) a window comprising a substantially spherical surface facing away from said sample, wherein a planar interface between said sample and said head is substantially index-matched, wherein said window substantially has rotational symmetry about an axis perpendicular to said interface;
    wherein said window receives said focused input beam and provides a confocal input beam to said sample,
    wherein said window provides said focused output beam responsive to a confocal output beam emitted from said sample,
    wherein said confocal input beam intersects with said confocal output beam at a target region in or on said sample;
    wherein said parabolic mirror is substantially rotationally symmetric about said axis;
    wherein said axis is substantially parallel to said collimated input beam;
    wherein said axis is substantially parallel to said collimated output beam.

2. The optical head of claim 1, wherein said window comprises a planar surface facing said sample, and wherein a refractive index of said window at said planar surface is substantially equal to a refractive index of said sample.

3. The optical head of claim 1, wherein said window comprises a concave surface facing said sample.

4. The optical head of claim 3, wherein a cavity between said window and said sample is filled with a fluid having a refractive index substantially equal to a refractive index of said sample during use of said optical head.

5. The optical head of claim 3, further comprising a solid medium affixed to said window and filling a cavity between said window and said sample, wherein said solid medium has a refractive index substantially equal to a refractive index of said sample.

6. The optical head of claim 1, wherein at least one of said input and output focused beams is substantially wave-front matched to said substantially spherical surface of said window.

7. The optical head of claim 1, wherein said input and output collimators are selected from the group consisting of refractive optical elements, reflective optical elements, diffractive optical elements, and combinations thereof.

8. The optical head of claim 1, wherein said window is integrated with said focusing element.

9. The optical head of claim 1, further comprising at least one scan mirror movably disposed to reflect at least one of said focused input and output beams, whereby a location of said target region is adjustable.

10. The optical head of claim 9, wherein said at least one scan mirror is uniaxially or biaxially tiltably mounted, whereby said location of said target region is movable substantially parallel to said planar interface.

11. The optical head of claim 9, wherein said at least one scan mirror comprises a tiltably mounted micromechanical mirror.

12. The optical head of claim 9, wherein said at least one scan mirror is translatably mounted in a direction perpendicular to said planar interface, whereby said location of said target region is movable substantially perpendicular to said planar interface.

13. The optical head of claim 12, further comprising a vertical actuator for translating said scan mirror, wherein said vertical actuator is selected from the group consisting of voice coils, piezoelectric actuators, linear micromechanical actuators, pneumatic actuators and hydraulic actuators.

14. The optical head of claim 1, wherein said second optical fiber emits an additional input beam, wherein said output collimator receives said additional input beam and provides an additional collimated input beam, wherein said focusing element receives said additional collimated input beam and provides an additional focused input beam, and wherein said window receives said additional focused input beam and provides an additional confocal input beam passing through said target region in said sample.

15. The optical head of claim 1, wherein an additional confocal output beam is emitted from said target region in said sample, wherein said window receives said additional confocal output beam and provides an additional focused output beam, wherein said focusing element receives said additional focused output beam and provides an additional collimated output beam, wherein said input collimator receives said additional collimated output beam and provides an additional output beam to said first optical fiber.

16. The optical head of claim 1, further comprising
    one or more additional input optical fibers, each emitting a corresponding additional input beam;
    one or more additional input collimators, each receiving one of said additional input beams and providing a corresponding additional collimated input beam;
    wherein said focusing element receives each of said additional collimated input beams and provides a corresponding additional focused input beam, wherein said window receives each of said additional focused input beams and provides a corresponding additional confocal input beam, wherein each of said additional confocal input beams passes through said target region in said sample.

17. The optical head of claim 16, wherein one or more of said additional input beams provides sufficient optical power to alter a property of said sample at said target region.

18. The optical head of claim 1, further comprising one or more additional output optical fibers, each receiving a corresponding additional output beam;

one or more additional output collimators, each providing one of said additional output beams responsive to a corresponding additional collimated output beam;

wherein said focusing element provides each of said additional collimated output beams responsive to a corresponding additional focused output beam, wherein said window provides each of said additional focused output beams responsive to a corresponding additional confocal output beam, wherein each of said additional confocal output beams passes through said target region in said sample.

19. The optical head of claim 1, wherein each optical fiber included in said head has an end within said head, and wherein all of said ends are disposed in a pattern which is substantially rotationally symmetric about said axis.

20. The optical head of claim 1, wherein said first and second optical fibers are selected from the group consisting of single-mode optical fibers and multi-mode optical fibers.

21. A method for coupling optical radiation between an optical head and a sample, the method comprising:

a) providing a first optical fiber emitting an input beam;

b) collimating said input beam to provide a collimated input beam with an input collimator;

c) focusing said collimated input beam with a focusing element comprising a parabolic mirror to provide a focused input beam;

d) transmitting said focused input beam through a window to provide a confocal input beam to said sample;

e) receiving a confocal output beam from said sample;

f) transmitting said confocal output beam through said window to provide a focused output beam;

g) collimating said focused output beam with said focusing element to provide a collimated output beam; and h) coupling said collimated output beam to a second optical fiber with an output collimator;

wherein said window comprises a substantially spherical surface facing away from said sample, wherein a planar interface between said sample and said head is substantially index-matched, wherein said window substantially has rotational symmetry about an axis perpendicular to said interface, wherein said confocal input beam intersects with said confocal output beam at a target region in or on said sample;

wherein said parabolic mirror is substantially rotationally symmetric about said axis;

wherein said axis is substantially parallel to said collimated input beam;

wherein said axis is substantially parallel to said collimated output beam.

* * * * *